United States Patent [19]

Harman

[11] Patent Number: 5,386,326
[45] Date of Patent: Jan. 31, 1995

[54] OSCILLATING ERASE CURRENT CIRCUIT

[75] Inventor: Jefferson H. Harman, Thousand Oaks, Calif.

[73] Assignee: Wangtek, Inc., Simi Valley, Calif.

[21] Appl. No.: 23,028

[22] Filed: Feb. 25, 1993

[51] Int. Cl.$^6$ .................... G11B 5/09; G11B 5/03
[52] U.S. Cl. ........................ 360/66; 360/46
[58] Field of Search ............ 360/66, 46, 67, 51, 360/68, 53, 39; 331/117 R, 113 A; 307/270

[56] References Cited

U.S. PATENT DOCUMENTS

| | | | |
|---|---|---|---|
| 3,666,893 | 5/1972 | Fujiwara et al. | 179/100.2 D |
| 3,666,893 | 5/1972 | Fujiwara et al. | 33.1/108 |
| 4,063,193 | 12/1977 | Wilcox | 331/113 R |
| 4,274,116 | 6/1981 | Ida | 380/805 |
| 4,280,153 | 7/1981 | Tim | 360/66 |
| 4,466,027 | 4/1984 | Howell et al. | 360/66 |
| 4,504,874 | 3/1985 | Imai | 360/66 |
| 4,511,935 | 4/1985 | Ishii et al. | 360/66 |
| 4,616,273 | 10/1986 | Ishii et al. | 360/66 |
| 4,779,146 | 10/1988 | Chuma et al. | 360/66 |
| 4,802,028 | 1/1989 | Ohnaka | 360/66 |
| 4,829,392 | 5/1989 | Kuniharu | 360/66 |
| 4,918,406 | 4/1990 | Baumbach et al. | 331/117 R |
| 4,953,043 | 8/1990 | Watanabe et al. | 360/66 |
| 5,168,483 | 12/1992 | Oka et al. | 360/66 X |

*Primary Examiner*—Donald Hajeo
*Assistant Examiner*—Le Thien Minh
*Attorney, Agent, or Firm*—Robbins, Berliner and Carson

[57] ABSTRACT

An oscillating erase current circuit for erasing information recorded on magnetic media. The inductance of an erase head is coupled with capacitors to form a tank circuit having a natural resonant frequency. The self-oscillating erase current circuit generates an oscillating signal having a frequency of oscillation determined by and therefore equal to the natural resonant frequency of the tank circuit. Once enabled, the self-oscillating erase current circuit continuously oscillates without any external drive circuit.

20 Claims, 2 Drawing Sheets

OSCILLATING ERASE CURRENT CIRCUIT

BACKGROUND OF THE INVENTION

1. Field of the Invention

The present invention relates generally to the erasure of magnetically recorded data. In particular, the present invention relates to AC erase current circuits for erasing digital data recorded on magnetic media such as magnetic tapes and disks.

2. Description of the Prior Art

Data is conventionally recorded on magnetic media by varying the magnetization along data tracks on the surface of the media. For example, digital data may be recorded at a particular point along a data track by magnetizing the surface of the media to provide a detectable flux transition at the desired point to represent a digital one or no flux transition at that point to represent a digital zero. The location of the point of interest is typically determined with an external reference, such as a clock pulse or magnetically recorded servo data.

By its nature magnetic media is typically written many times, so that when data is recorded, it must be assumed that the data to be recorded is to be written over previously recorded data. In order to provide accurate and reproducible results, the recording processes therefore often includes an erasing step in which previously recorded data, if any, is erased before the new data is recorded. A read after write step is then often performed in which the newly written data is then immediately read to verify that it was accurately written.

Erasure is conventionally achieved by demagnetizing the media to remove all flux transitions. Erasure is typically performed by an electromagnet, known as a magnetic head, placed in the vicinity of the surface of the magnetic media and driven by an electrical current to form a magnetic field at the appropriate time to erase the data. Early erasure heads used direct current or DC excitation which resulted in a magnetic field having a constant magnitude and direction so that the flux transitions representing recording data, if any, were effectively obliterated.

Improved erasure characteristics were provided by the use of alternating current or AC excitation of the erasure head. An AC excited erase head applies a rapidly alternating magnetic field to the media. As distinct from the DC excited erase head which left the media with magnetic saturation at one level, the AC excited erase head subjects the magnetic media to a rapidly fluctuating field which is reduced in magnitude as the relative position between the media and erase head is increased by, for example, tape motion. The rapidly fluctuating, decreasing field results in minimal remanent polarization of the magnetic media, reducing noise and improving the quality of the later written and recorded data.

Conventional AC excited erase head designs, one of which is shown for example, in U.S. Pat. No. 4,666,027 issued in 1984 to Howell, Miller and Buchan and assigned to Archive Corporation, are relatively complex and inefficient. Since the magnitude of the applied erase field typically varies in accordance with component selection, component selection becomes critical. In accordance with conventional manufacturing processing, the actual value of the erase head inductance can vary as much as 20% from the design value; the actual value of the capacitors can vary by as much as 10% from the design value. Consequently, the frequency of the excitation may generally not match the resonant frequency of the tank. This problem has typically been addressed by costly individual tuning of each erase head, by using an erase head of such high efficiency that the lowest erase current will be sufficient to perform adequate erase, or by driving the erase head hard enough so that the lowest resulting field magnitude will be sufficient to provide satisfactory erasure.

Additionally, conventional AC excited erase heads produce unwanted harmonic oscillations at multiples of their excitation or resonant frequencies. These unwanted higher frequency signals interfere with other operations of the data recording and retrieval systems by, for example, interfering with the read after write step described above. Conventional AC excited erase heads therefore typically require harmonic suppression circuitry, typically in the power supply circuitry, to minimize interference from such unwanted signals.

What is needed is a circuit which further improves the quality and consistent magnitude of the erase field, and in particular, a circuit which reduces the need for costly individual tuning and critical component selection.

SUMMARY OF THE INVENTION

The preceding and other shortcomings of prior art systems are addressed and overcome by the present invention that provides, in a first aspect, a magnetic recording system for transferring information to and from magnetic media having means for communicating with the magnetic media, erase head inductance means, capacitance means coupleable with the erase head inductance means to form a tank circuit having a natural resonant frequency and oscillator means for causing the tank circuit to oscillate at its natural resonant frequency to apply an AC magnetic field to the magnetic media.

In another aspect, the present invention provides a magnetic information recording system for transferring information to and from magnetic media having means for communicating with the magnetic media, erase head inductance means, capacitance means coupleable with the erase head inductance means to form a tank circuit having a natural resonant frequency, oscillator means for causing the tank circuit to oscillate at the natural resonant frequency to apply an AC magnetic field to the magnetic media, drive means operatively connected to the oscillator means for generating an input signal corresponding to an excitation frequency for driving the oscillator means, and feedback means for adjusting the drive means so that the excitation frequency matches the natural resonant frequency of the tank circuit.

In a further aspect, the present invention provides a method for erasing information recorded on magnetic media by generating an oscillatory signal having a frequency of oscillation determined by and therefore equal to the natural resonant frequency of a tank circuit, providing an erase head with the oscillatory signal for erasing information recorded on the magnetic media, moving the magnetic media by the erase head, and subjecting the magnetic media to a rapidly fluctuating field produced by the oscillatory signal and movement of the magnetic media so that the rapidly fluctuating field is reduced in magnitude as the relative position between the magnetic media and the erase head is increased.

In still a further aspect, the present invention provides a method for erasing information recorded on magnetic media by generating an oscillatory signal having a frequency of oscillation determined by and therefore equal to the natural resonant frequency of a tank circuit, providing an erase head with the oscillatory signal for erasing information recorded on the magnetic media, moving the magnetic media by the erase head, subjecting the magnetic media to a rapidly fluctuating field produced by the oscillatory signal and movement of the magnetic media so that the rapidly fluctuating field is reduced in magnitude as the relative position between the magnetic media and the erase head is increased, generating a drive signal corresponding to an excitation frequency for driving the oscillatory signal, and adjusting the excitation frequency to match the natural resonant frequency of the tank circuit.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT

Figure 1:
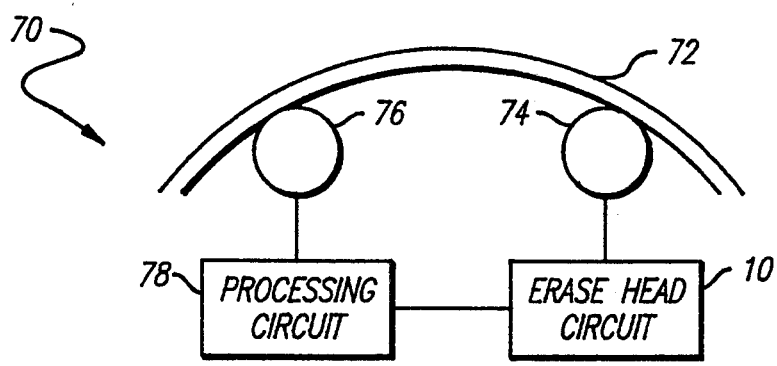
FIG. 1 is a diagram showing a magnetic information recording system according to the present invention for transferring information to and from magnetic media.

FIG. 1 is a diagram of a magnetic recording system 70 including magnetic media 72, read/write head 74, erase head 76, self-oscillating erase head circuit 10 and data processing circuitry 78. Magnetic recording system 70 operates through the relative motion between magnetic media 72 and read/write head 74. Magnetic media 72 may be a magnetic tape cassette, cartridge, diskette or other magnetic media. Read/write head 74 writes data to and reads data from magnetic media 72. Read/write head 74 includes a read gap and a write gap. Movement of the read/write head 74, therefore, results in movement of both the read and the write gap. In another embodiment, a read gap is provided on a first head and a write gap is provided on a second head which is operatively connected with the first head such that movement of one head, with respect to the magnetic media 72, results in like movement of the other head.

Erasure of previously recorded information is achieved by the use of alternating current or AC excitation of the erasure head 76. Self-oscillating erase head circuit 10 generates an oscillating current for AC excitation having a frequency of oscillation determined by and equal to the natural resonant frequency of a tank circuit 68. An AC excited erase head 76 applies a rapidly fluctuating magnetic field to the magnetic media 72. The rapidly alternating magnetic field is produced by the oscillatory signal generated by the self-oscillating erase head circuit 10 and movement of the magnetic media 72 so that the rapidly fluctuating field is reduced in magnitude as the relative position between the magnetic media 72 and the erase head 76 is increased. The rapidly fluctuating, decreasing field results in minimal remanent polarization of the magnetic media 72, reducing noise and improving the quality of the later written and recorded data. Data processing circuitry 78 processes information for numerous functions, including controlling the read/write head 74 and enabling and disabling the self-oscillating erase head circuit 10.

Figure 2:
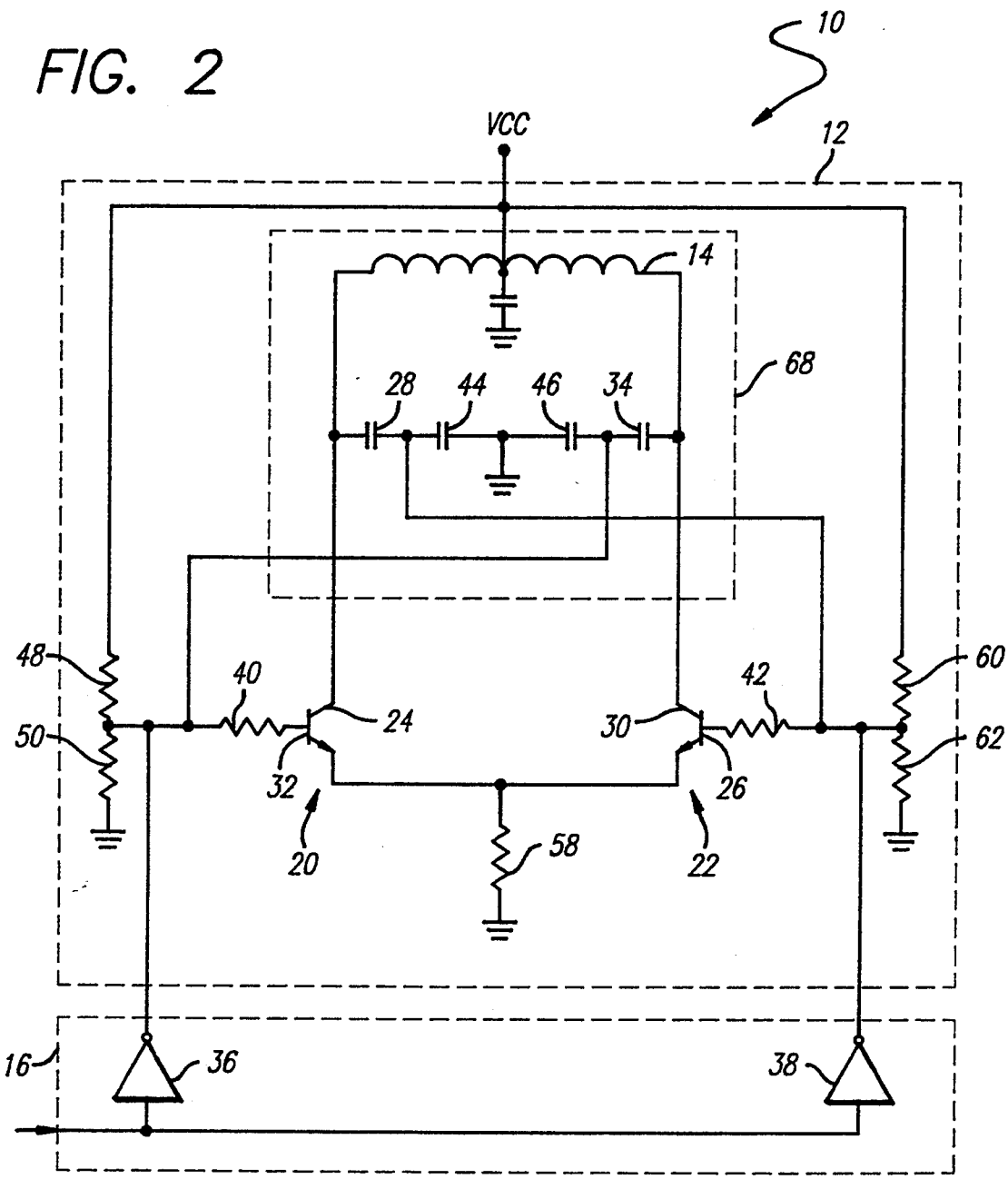
FIG. 2 is a schematic diagram of a self-oscillating erase head current circuit according to the present invention.

FIG. 2 is a diagram of a self-oscillating erase head circuit 10 including oscillator circuit 12 with center tapped erase head coil or inductor 14 and erase enable circuit 16. Self-oscillating erase head circuit 10 generates an oscillating current for AC excitation having a frequency of oscillation determined by and equal to the natural resonant frequency of a tank circuit 68. Tank circuit 68 includes the natural inductance of the erase head 14.

Oscillator circuit 12 includes emitter coupled bipolar transistors 20 and 22. The emitters of transistor 20 and 22 are coupled by resistor 58 to form a current limiting stage. Resistor 58 is connected between the emitters of transistors 20 and 22 and ground. Resistor 40 is connected between the base 32 of transistor 20 and the external power supply, Vcc. Similarly, resistor 42 is connected between the base 26 of transistor 22 and Vcc. Resistors 40 and 42 provide for parasitic damping by reducing the effects of smaller changes in the base current related to parasitic oscillation. Parasitic oscillations at undesirable frequencies are therefore dampened.

Once enabled, oscillator circuit 12 continuously oscillates without any external drive circuit. The frequency of oscillation is determined by and therefore equal to the natural resonant frequency of tank circuit 68. Tank circuit 68 is comprised of erase head coil 14, capacitors 28, 44, 34, and 46 connected in series, plus other capacitance, such as stray capacitance. Since the frequency of oscillation is determined by and therefore equal to the natural resonant frequency of tank circuit 68, oscillator circuit 12 operates therefore at resonance or very close thereto.

The erase head coil 14 is resonated with the series combination of capacitors 28, 44, 34, and 46. One end of the erase head coil 14 is connected to the collector 24 of transistor 20 and the other end is connected to the collector 30 of transistor 22, such that the erase head coil 14 serves as a balanced load to the emitter coupled transistor pair. The center tap of erase head coil 14 is connected to the external power supply, Vcc. The center tap is an electrical connection made at the center of erase head coil or inductor 14, so there are roughly an equal number of turns between each end of the coil or inductor 14 and the center tap.

In addition to being part of the tank circuit 68, capacitors 28 and 44 form a capacitive voltage divider for coupling the voltage at the collector 24 of transistor 20 to the base 26 of transistor 22 to provide a positive feedback path for maintaining oscillation. Capacitors 28 and 44 also reduce high collector voltage to low base voltage so large collector swings could occur at transistor 22 without saturation. The step down ratio of the voltage divider is chosen so that the voltage at the base 26 of transistor 22 is sufficiently small enough to avoid saturation. The amplitude is therefore controlled by switching the current in current limiting resistor 58 between transistors 20 and 22. Similarly, in addition to being part of the tank circuit 68, capacitors 34 and 46 form a second capacitive voltage divider for coupling the voltage at the collector 30 of transistor 22 to the base 32 of transistor 20 to provide a second feedback path for oscillation. This second feedback path is redundant, either feedback path is sufficient for maintaining oscillation. However, the use of a second feedback results in a better balanced circuit which has less even harmonic distortion.

The resistive voltage divider formed by resistors 48 and 50 and the one formed by resistors 60 and 62 serve to provide bias. Specifically, the bias voltage for transistor 20 is determined by the voltage divider network composed of resistors 48 and 50 connected between the external power supply, Vcc, and ground. The bias voltage for transistor 22 is determined by the voltage divider network composed of resistors 60 and 62 connected between the external power supply, Vcc, and ground.

Enable circuit 16 enables and disables oscillator circuit 12. To enable oscillator circuit 12, a steady state signal is applied to open collector gates 36 and 38. Open collector gates 36 and 38 act as an on-off switch so that oscillator circuit will only be activated when erasing is desired. During erase, the enable 16 is activated and the base 32 of transistor 20 and the base 26 of transistor 22, normally tied to ground, are pulled up by bias network. For illustrative purposes, the following discussion will assume transistor 22 is initially turned.

In operation, an overhead voltage of 1.5 V is required to be maintained at the collector 30 of transistor 22 to allow unsaturated operation. During oscillation, when the minimum voltage occurs at the collector 30 of transistor 22, the maximum voltage simultaneously occurs at the collector 24 of transistor 20. When transistor 22 is ON, the voltage drop across the transistor and current limiting resistor 58 is 1.5 V. The voltage at the collector 24 of transistor 20, the OFF transistor, is equal to 22.5 V. The voltage across the center of erase head coil 14 to the end of erase head coil 14 is 10.5 V. At the other end of erase head coil 14, the voltage is 22.5 V, 10.5 V above the center tap voltage of 12 V. The peak-to-peak voltage at each collector is thus equal to 21 V, for 42 V peak-to-peak across the full erase coil 14.

The base emitter junction of transistors 20 and 22 are forward biased by resistors 48, 50 and 60, 62. The DC base to ground voltage for transistor 20, $V_{B1}$ is determined by the voltage-divider network composed of resistors 48 and 50 connected between an external voltage source and ground. Resistors 48 and 50 can be tied to external voltage source Vcc, or to another external voltage source, such as to a transistor used for biasing. Similarly, the base to ground voltage for transistor 22, $V_{B2}$, is determined by the voltage-divider network composed of resistors 60 and 62 connected between an external voltage source and ground.

In a typical case, transistors 20 and 22 in FIG. 1 are silicon transistors with each transistor having a turn on voltage approximately equal to 0.7 volts. Typical values of other components are shown below in Table 1:

TABLE 1

| COMPONENT | VALUE/TOLERANCE |
|---|---|
| Capacitor 28 | 150 pF |
| Capacitor 34 | 150 pF |
| Capacitor 44 | 3300 pF |
| Capacitor 46 | 3300 pF |
| Resistor 40 | 100 ohms |
| Resistor 42 | 100 ohms |
| Resistor 48 | 619 ohms/1% |
| Resistor 50 | 274 ohms/1% |

TABLE 1-continued

| COMPONENT | VALUE/TOLERANCE |
|---|---|
| Resistor 58 | 15 ohms/1% |
| Resistor 60 | 619 ohms/1% |
| Resistor 62 | 274 ohms/1% |
| Resistor 64 | 100 ohms |

The invention as described above and shown in FIG. 2 is not limited to what has been shown and described hereinabove, nor the dimensions or sizes of the physical implementation described immediately about. For example, the oscillating erase current circuit can be implemented using junction or MOS field-effect transistors, instead of bipolar transistors.

In an alternate embodiment of the invention, an external drive circuit is used to drive the tank circuit in an oscillating erase current circuit, such as the oscillating erase current circuit shown in FIG. 2. A feedback loop is used to adjust the external drive circuit so that the frequency of the excitation matches the resonant frequency of the tank network 68.

Figure 3:
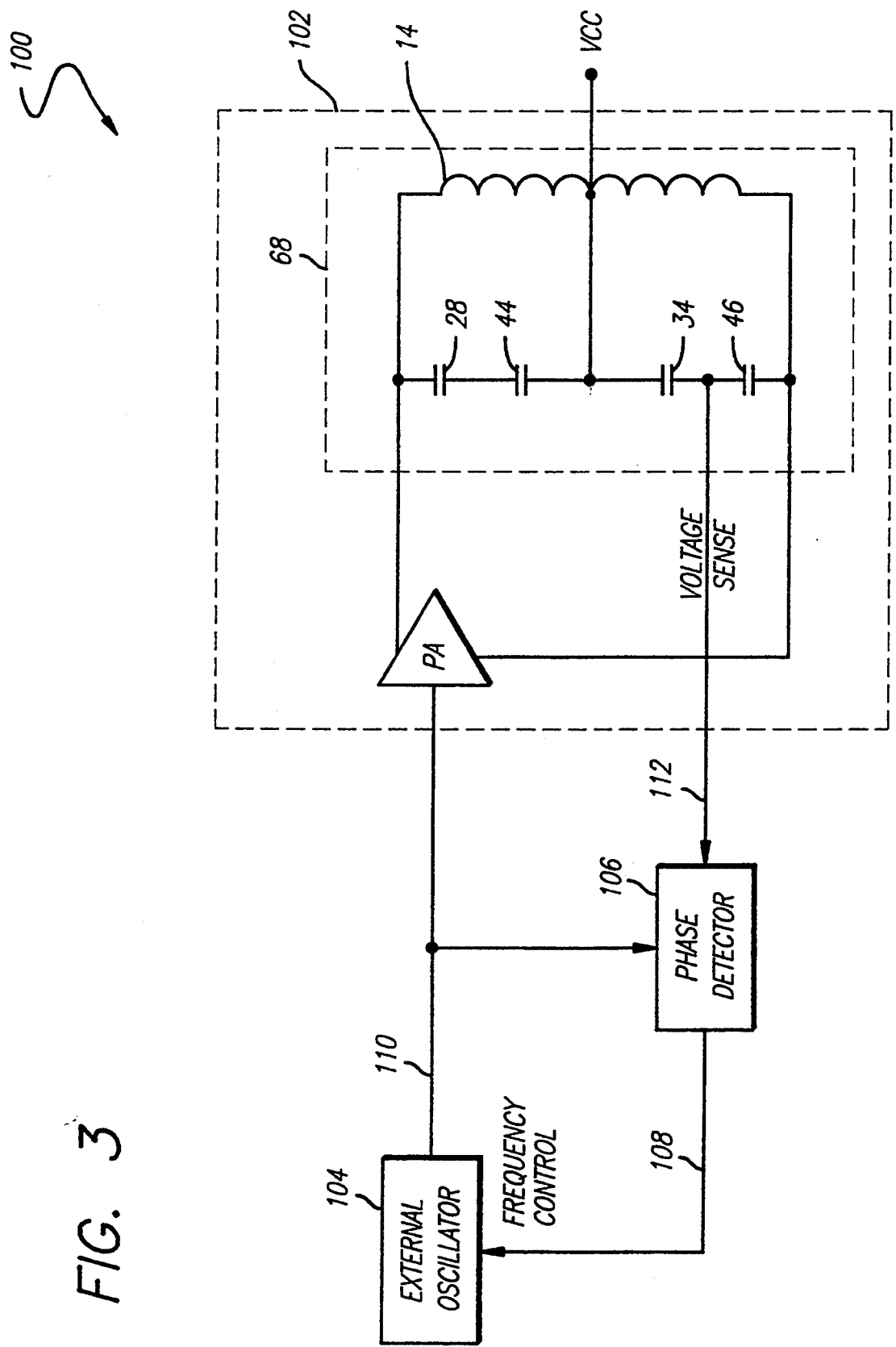
FIG. 3 is a schematic diagram of a erase head current circuit according to another embodiment of the invention.

One such implementation of the invention is shown in FIG. 3. FIG. 3 is a diagram of an externally driven erase head circuit 100 including erase circuit 102, external oscillator 104, phase detector 106, and feedback path 108. Erase circuit 102 can be a push-pull amplifier oscillator as shown in FIG. 2. Erase circuit 102 includes tank circuit 68 comprised of erase head coil 14, capacitors 28, 44, 34, and 46 connected in series, plus other capacitance, such as stray capacitance. The erase head coil 14 is resonated with the series combination of capacitors 28, 44, 34, and 46. At resonance, the resonated erase head 14 forms a bandpass filter having zero phase shift between the applied current and the voltage across the network. Below resonance, the voltage leads the applied current. Above resonance, the voltage lags the applied current.

External oscillator 104, typically a voltage controlled oscillator, provides an input drive signal 110 to erase circuit 102. Input drive signal 110 is also applied to phase detector 106. Phase detector 106 compares the phase of input drive signal 110 with the phase of an output signal 112 from tank circuit 68. If there is a difference, the phase detector produces an error signal 114, typically in the form of a correction voltage, which is fed to voltage controlled oscillator 104 to bring its frequency into line with that of the tank circuit. Phase detector 106 typically includes internal filtering means for providing a filtered error signal 114. Thus a correction voltage is produced whenever the voltage controlled oscillator 104 and the tank circuit 68 frequencies differ.

In operation, phase detector 106 compares the phase of the output signal 112 from the tank circuit 68 with the input drive signal 110 from external oscillator 104 and then applies error signal 114 on feedback loop 108 to adjust external oscillator 104 so that the frequency of the excitation matches the resonant frequency of the tank network 68. As long as the frequencies are the same, no error signal is feedback to the external oscillator 104. But if there is a difference, an error signal is fed back to the external oscillator 104 until its frequency changes to agree with the tank output.

The invention as described above is not limited to what has been shown and described in FIG. 3. For example, in an alternate embodiment, an erase circuit measures the magnitude of the current in the erase head coil 14 and then uses a feedback loop to adjust an external drive circuit so that the frequency of the excitation matches the resonant frequency of a tank network including the natural inductance of the erase head. In other words, the frequency of the external drive circuit is controlled by a feedback loop measuring the magnitude of the current in the erase head coil 14. Additionally, a sensing circuit determines whether the external drive frequency should be increased or decreased. For example, after the external drive frequency is adjusted in a particular direction, i.e. either upward or downward, the sensing circuit determines whether the external drive frequency has been adjusted in the correct direction, and if not, the frequency of the external drive is adjusted in the opposite direction.

It will be appreciated by persons skilled in the art that the present invention is not limited to what has been shown and described hereinabove, nor the dimensions or sizes of the physical implementation described immediately about. The scope of the invention is limited solely by the claims, which follow.

What is claimed is:

1. A magnetic information recording system for transferring information to and from magnetic media, comprising:
   means for transferring information to and from said magnetic media;
   erase head inductance means;
   capacitance means coupleable with said erase head inductance means to form a tank circuit having a natural resonant frequency; and
   oscillator means for causing said tank circuit to oscillate at said natural resonant frequency to apply an ac magnetic field to said magnetic media, wherein said oscillator means further comprises a self-oscillating circuit and feedback means for causing oscillation at a frequency determined by and equal to said natural resonant frequency of said tank circuit.

2. The magnetic information recording system claimed in claim 1 wherein said self-oscillating circuit further comprises a push-pull amplifier oscillator.

3. The magnetic information recording system claimed in claim 2 wherein said feedback means further comprises said tank circuit.

4. The magnetic information recording system claimed in claim 3 wherein said oscillator means for causing said tank circuit to oscillate at said natural resonant frequency further comprises:
   means connected to said feedback means for maintaining oscillation at a frequency determined by and equal to said natural resonant frequency of said tank circuit.

5. The magnetic information recording system claimed in claim 4 wherein said means for maintaining oscillation further comprises amplification means.

6. A magnetic information recording system for transferring information to and from magnetic media, comprising:
   means for transferring information to and from said magnetic media;
   erase head inductance means;
   capacitance means coupleable with said erase head inductance means to form a tank circuit having a natural resonant frequency;
   oscillator means for causing said tank circuit to oscillate at said natural resonant frequency to apply an ac magnetic field to said magnetic media;
   drive means operatively connected to said oscillator means for generating an input signal corresponding to an excitation frequency for driving said oscillator means; and
   feedback means for adjusting said drive means so that said excitation frequency matches said natural resonant frequency of said tank circuit.

7. The magnetic information recording system claimed in claim 6 wherein said feedback means further comprises:
   phase detection means for comparing the phase of said input signal with phase of said tank circuit to generate an error signal; and
   means for adjusting said drive means in response to said error signal so that said excitation frequency matches said natural resonant frequency of said tank circuit.

8. The magnetic information recording system claimed in claim 6 wherein said feedback means further comprises:
   detection means for measuring the magnitude of a current in said tank circuit and generating an error signal in response thereto; and
   means for adjusting said drive means in response to said error signal so that said excitation frequency matches said natural resonant frequency of said tank circuit.

9. A method for erasing information recorded on magnetic media, comprising the steps of:
   generating an oscillatory signal having a frequency of oscillation determined by and therefore equal to the natural resonant frequency of a tank circuit, wherein said step of generating an oscillatory signal further comprises the steps of:
   generating feedback signals in response to the natural resonance of said tank circuit; and
   applying said feedback signals to means for maintaining oscillation to generate said oscillatory signal having a frequency of oscillation determined by and therefore equal to the natural resonant frequency of said tank circuit such that self-oscillation occurs;
   providing an erase head with said oscillatory signal for erasing information recorded on said magnetic media;
   moving said magnetic media by said erase head; and
   subjecting said magnetic media to a rapidly fluctuating field produced by said oscillatory signal and movement of said magnetic media so that said rapidly fluctuating field is reduced in magnitude as the relative position between said magnetic media and said erase head is increased.

10. The method claimed in claim 9 wherein said step of generating an oscillatory signal having a frequency of oscillation determined by and therefore equal to the natural resonant frequency of a tank circuit further comprises the step of:
    combining the inductance of said erase head with capacitance means to form said tank circuit.

11. The method claimed in claim 10 wherein said step of generating an oscillatory signal having a frequency of oscillation determined by and therefore equal to the natural resonant frequency of a tank circuit further comprises the step of:
    generating feedback signals in response to the natural resonance of said tank circuit.

12. The method claimed in claim 11 wherein said step of generating an oscillatory signal having a frequency of oscillation determined by and therefore equal to the natural resonant frequency of a tank circuit further comprises the step of:

applying said feedback signals to means for maintaining oscillation to generate said oscillatory signal.

13. A method for erasing information recorded on magnetic media, comprising the steps of:

generating an oscillatory signal having a frequency of oscillation determined by and therefore equal to the natural resonant frequency of a tank circuit;

providing an erase head with said oscillatory signal for erasing information recorded on said magnetic media;

moving said magnetic media by said erase head;

subjecting said magnetic media to a rapidly fluctuating field produced by said oscillatory signal and movement of said magnetic media so that said rapidly fluctuating field is reduced in magnitude as the relative position between said magnetic media and said erase head is increased;

generating a drive signal corresponding to an excitation frequency for driving said oscillatory signal; and adjusting said excitation frequency to match said natural resonant frequency of said tank circuit.

14. The method claimed in claim 13 wherein said adjusting step further comprises the steps of:

comparing a phase of said drive signal with a phase of a tank circuit output signal to generate an error signal; and adjusting said drive means in response to said error signal so that said excitation frequency matches said natural resonant frequency of said tank circuit.

15. The method claimed in claim 13 wherein said adjusting step further comprises the steps of:

measuring a magnitude of a current in said tank circuit and generating an error in response thereto; and adjusting said drive means in response to said error signal so that said excitation frequency matches said natural resonant frequency of said tank circuit.

16. A magnetic information recording system for transferring information to and from magnetic media, comprising:

means for writing information to and reading information from said magnetic media;

erase head inductance means;

capacitance means coupleable with said erase head inductance means to form a tank circuit having a natural resonant frequency; and means for generating an oscillatory signal having a frequency of oscillation determined by and therefore equal to the natural resonant frequency of said tank circuit to apply an ac magnetic field to said magnetic media; wherein said means for generating an oscillatory signal further comprises a self-oscillating circuit and feedback means for causing oscillation at a frequency determined by and equal to said natural resonant frequency of said tank circuit.

17. A magnetic information recording system for transferring information to and from magnetic media, comprising:

means for writing information to and reading information from said magnetic media;

erase head inductance means;

capacitance means coupleable with said erase head inductance means to form a tank circuit having a natural resonant frequency;

means for generating an oscillatory signal having a frequency of oscillation determined by and therefore equal to the natural resonant frequency of said tank circuit to apply an ac magnetic field to said magnetic media;

means operatively connected to said oscillator means for generating an input signal corresponding to an excitation frequency for driving said oscillator means; and means for adjusting said excitation frequency to match said natural resonant frequency of said tank circuit.

18. The magnetic information recording system claimed in claim 17 wherein said adjusting means further comprises:

means for comparing the phase of said input signal with phase of said tank circuit to generate an error signal; and means for adjusting said drive means in response to said error signal so that said excitation frequency matches said natural resonant frequency of said tank circuit.

19. The magnetic information recording system claimed in claim 17 wherein said adjusting means further comprises:

means for measuring the magnitude of a current in said tank circuit and generating an error signal in response thereto; and means for adjusting said drive means in response to said error signal so that said excitation frequency matches said natural resonant frequency of said tank circuit.

20. The magnetic information recording system claimed in claim 16 wherein said feedback means further comprises said tank circuit.

* * * * *